(12) United States Patent
Mengoli et al.

(10) Patent No.: US 12,350,831 B2
(45) Date of Patent: Jul. 8, 2025

(54) METHOD FOR REPLACING A COMPONENT IN AN AUTOMATIC MACHINE

(71) Applicant: G.D. SOCIETA'PER AZIONI, Bologna (IT)

(72) Inventors: Fausto Mengoli, Sasso Marconi (IT); Giancarlo Dattilo, Bologna (IT); Emilio Tirelli, Bologna (IT); Giuliano Gamberini, Bologna (IT)

(73) Assignee: G.D. SOCIETA' PER AZIONI, Bologna (IT)

( * ) Notice: Subject to any disclaimer, the term of this patent is extended or adjusted under 35 U.S.C. 154(b) by 0 days.

(21) Appl. No.: 18/275,633

(22) PCT Filed: Feb. 15, 2022

(86) PCT No.: PCT/IB2022/051327
§ 371 (c)(1),
(2) Date: Aug. 3, 2023

(87) PCT Pub. No.: WO2022/172256
PCT Pub. Date: Aug. 18, 2022

(65) Prior Publication Data
US 2024/0109189 A1     Apr. 4, 2024

(30) Foreign Application Priority Data
Feb. 15, 2021   (IT) .................. 102021000003362

(51) Int. Cl.
*B25J 9/16*       (2006.01)
*B25J 13/08*      (2006.01)
(Continued)

(52) U.S. Cl.
CPC ............ *B25J 9/162* (2013.01); *B25J 9/1664* (2013.01); *B25J 13/089* (2013.01); *B23P 19/105* (2013.01);
(Continued)

(58) Field of Classification Search
CPC ........ B25J 9/162; B25J 9/1664; B25J 13/089; B23P 19/105; Y10T 29/4978; B65H 19/305
See application file for complete search history.

(56) References Cited

FOREIGN PATENT DOCUMENTS

DE    202015102191 U1 *   9/2016   ............ B65H 19/12
JP    S63182424 A         7/1988
(Continued)

OTHER PUBLICATIONS

International Application No. PCT/IB2022/051327, International Search Report and Written Opinion, May 20, 2022.

*Primary Examiner* — Jermie E Cozart
(74) *Attorney, Agent, or Firm* — MARSHALL, GERSTEIN & BORUN LLP

(57) ABSTRACT

A method for replacing a working component in an automatic machine has a mapping phase and a working phase. The mapping phase involves defining a first reference point fixed relative to the automatic machine and a position in machine of the working component. The working phase involves: stopping the automatic machine (2); starting a procedure of configuration change preparing the automatic machine for a withdrawal of the working component; detecting the first reference point; determining the position in machine of the working component; picking up the working component from the position in machine by means of a gripping device; releasing the working component in a storing position; picking up a replacement working component from a stocking position by means of the gripping device; positioning the gripping device at the position in machine; and inserting and fixing the replacement working component in the position in machine.

14 Claims, 3 Drawing Sheets

(51) Int. Cl.
*B23P 19/10* (2006.01)
*B65H 19/30* (2006.01)

(52) U.S. Cl.
CPC ......... *B65H 19/305* (2013.01); *Y10T 29/4978* (2015.01)

(56) References Cited

FOREIGN PATENT DOCUMENTS

WO     WO-2019/155421 A1    8/2019
WO     WO-2019/207436 A1    10/2019

* cited by examiner

METHOD FOR REPLACING A COMPONENT IN AN AUTOMATIC MACHINE

CROSS-REFERENCE TO RELATED APPLICATIONS

This Patent Application is a US National Phase of International Application No. PCT/IB2022/051327, filed Feb. 15, 2022, which claims priority from Italian Patent Application No. 102021000003362 filed on Feb. 15, 2021, the entire disclosure of each are incorporated herein by reference.

TECHNICAL FIELD

The present invention falls within the technical field of automatic machines. More in detail, the present invention relates to a method for automatically or semi-automatically replacing one or more components in an automatic machine. It also refers to an apparatus comprising an automatic machine for manufacturing or packaging and a working unit, designed to carry out the aforementioned method.

The present invention finds a preferred but not exclusive application in the technical field of automatic machines for manufacturing and packaging cigarettes, to which reference can be made in the following without losing generality.

PRIOR ART

The automatic machines, more specifically the automatic manufacturing or maker machines and the automatic packaging or packer machines should preferably be able to diversify the production in order to produce different types of final products, each characterized by distinct specifications. In these cases, it is possible that one or more components of the automatic machine must be replaced depending on the type of final product.

The known technique provides that the replacement of said components in the automatic machine is carried out manually by two or three operators, who visually or by means of an identification code (bar code, QR code, RFID, . . . ) identify one or more components to be replaced, remove the outer elements, if necessary, disassemble the components being replaced, for example, by unscrewing the relative screws and bushings, lift and store the disassembled components with the possible aid of mechanical lifting means, identify once again either visually or by means of an identification code one or more replacement components, pick up the latter and finally assemble the same on the machine.

In the present description and in the claims attached thereto, some terms and expressions are deemed to have, unless otherwise explicitly indicated, the meaning expressed in the following definitions.

The term "component" means any element or device or unit or assembly designed to be assembled on and disassembled from an automatic machine.

A component is defined "working" when it is, or is designed to become, an integral part of the automatic machine, namely, it is one of the elements that joined together form the automatic machine and is configured to carry out a given type of processing on consumable materials processed by the same automatic machine for manufacturing the final product.

A component is "subject to replacement" when it is not able to ensure the correct operation of the automatic machine, as it is damaged or worn out or exhausted following use, or is suitable for the production of a regular product but different from the final one expected at output from the machine.

A "replacement component" is a component capable of ensuring the correct operation of the automatic machine for the production of the final product expected at output from the machine and can be the same as the component being replaced (when the latter was intact or new) or differ from the latter due to given characteristics such as, for example, the size or shape.

The term "coordinate" means an ordered set of numbers capable of biunivocally identifying the position of a point on a plane or in a volume of space relative to a reference system. For the purposes of the present invention Cartesian coordinates, polar coordinates and ellipsoidal coordinates are to be considered equivalent and interchangeable.

A "configuration" is a state of the automatic machine in which each component assembled on the latter has a well-defined position, orientation and speed which are substantially constant or variable over time according to a periodic law.

The meaning of "configuration change" is a change in position and/or orientation and/or speed of at least one component assembled on the automatic machine so that the latter acquires a different configuration from the one immediately preceding it.

The term "preparing" the machine for a purpose means a set of steps that lead the automatic machine to acquire a configuration suitable for achieving the purpose. This set of steps forms a "procedure of configuration change".

An automatic machine is designed to pick up a component from a position in machine when this component is freely accessible from the outside, in particular when all the possible outer components are removed from a space around the component by modifying the position and/or the orientation and/or speed of the latter, and any safety blocks of the component by intervening from the outside, for example, by the operator, are excluded.

An automatic machine is designed to operate with a component when this component is able to function correctly and safely in the automatic machine, in particular when the fixing components and any safety blocks acting on the component have been activated.

For example, an automatic packaging machine comprises at least one drum fixed to the machine by means of a relative fixing system, such as a comb or multiple blades that are inserted into suitable cavities of the drum and/or pneumatic grippers that tighten the drum shaft. In the absence of outer components, protections and safety blocks, the automatic packaging machine is designed to pick up the drum when the fixing comb rotates on a slide or the fixing blades move so as to disengage the cavities of the drum in which they were inserted, and/or the pneumatic grippers release the drum shaft, so that the comb, the blades and the pneumatic grippers do not interfere with the picking up of the component. In a completely specular way, the automatic packaging machine is designed to operate with the drum when the fixing comb rotates on a slide or the fixing blades move so as to engage the cavities of the drum, and/or the pneumatic grippers tighten the drum shaft.

A "gripping device" is a member, of the mechanical or electromechanical or pneumatic or hydraulic type, capable of firmly and safely gripping a component. By way of non-exhaustive example, various types of hooks, grippers, suction cups, magnets and vacuum pumps fall within the definition of gripping device. For the purposes of the present invention, the use of a gripping device or the use of two gripping devices are to be considered as technical equivalents, as will become clear in the following description.

The term "storage area" denotes a surface or preferably a space designed to contain one or more components when not assembled on the automatic machine, these components being placed in a fixed or movable position, for example, with the support of suitable handling means such as, for example, a trolley without constraints or on rails, guided by an operator or automated guide, a lift, a conveyor belt and the like, within the same storage area.

The meaning of "storing position" of a component is the position within the storage area occupied by this component at the moment in which a gripping device substantially ceases to exert force on the latter for it to be released.

The meaning of "stocking position" of a component is a position within the storage area occupied by this component at the moment in which a gripping device substantially begins to exert force on the latter for it to be picked up.

Storing position and stocking position may differ or be substantially coincident.

A path is "optimal" when at least one among length and time of travel along this path is substantially as short as possible. Preferably, when a gripping device is moved along an optimal path, no collision of the gripping device with components or further external elements occurs. Equally preferably, when a gripping device which grips a component is moved along an optimal path, no collision of either the gripping device or the component occurs with other components or further elements external to the machine.

For the purposes of the present invention, the use of an electronic processor or similar programmable system capable of carrying out mathematical calculations and data processing or the use of at least two electronic processors or similar programmable systems, preferably interconnected with each other are to be considered as technical equivalents.

The applicant has noted that the market increasingly requires automatic packaging machines capable of producing products of different types or formats, possibly even in small batches, which in the face of the so-called format change, namely, change of one or more components assembled on the machines, are flexible in the transition from manufacturing products of a first type to manufacturing products of a second type.

The applicant has noted that format change operations have various drawbacks, among which the long downtime (over ten hours) and the involvement of specialized operators, dedicated to carrying out repetitive, physically demanding activities (the manoeuvring of the fixing members for example) and which can therefore be subject to human errors. Also, as a result of this, appropriate and important safety procedures are implemented during the format change for the safety of all personnel working in the area affected by the operations.

The applicant has also noted that the most laborious format change, which involves considerable and highly impacting modifications on the packaging machine to adapt it to the new production, is that which affects one or more geometric parameters of the intermediate or final product.

In the exemplary case of machines for manufacturing and packaging cigarettes, each cigarette is characterized, among other things, by specific measurements in diameter, length of the filter, length of the tobacco cylinder and length of the finished cigarette. If the change in production affects the diameter of the final product, for example, to switch from the production of super slim-size type cigarettes with a diameter of 5.4 mm to that of king-size type cigarettes with a diameter of 8 mm, various components, sometimes bulky and heavy, must be replaced in the machine including, for example, the forming beam of the machine and the drums of the filter insertion unit. Likewise, considerable variations in the lengths of the filter or of the tobacco cylinder or of the finished cigarette can lead to the replacement of entire units assembled on the packaging machine.

As a consequence of the above, the applicant has found that in the format change process it is important to reduce machine downtimes, minimize the probability of error, reduce the need for dedicated specialized personnel as well as the physical work sustained by the same.

The applicant therefore has felt the need to minimize the manual intervention of the operators on an automatic machine that requires replacement operations, in particular format change, since this manual intervention is the main cause of the long machine downtime and of procedural errors, as well as important physical work for the operators.

The patent application WO2019207436A1 describes an Automated Guided Vehicle which supports a robotic arm to automatically carry out replacement of a reel (namely, a consumable material) in an unwinding station of an automatic packaging machine.

DESCRIPTION OF THE INVENTION

The applicant has noted that providing the automatic machine with a gripping device designed to pick up the component to be replaced would not have been sufficient for said purpose, since each component of the automatic machine is generally assembled on the same in a firm and secure manner by means of fixing and locking elements and removing these fixing and locking elements by means of the aforementioned gripping device can be particularly complicated and in any case require the intervention of an operator.

The applicant, however, has understood that providing a procedure in which the same automatic machine prepares to pick up the component to be replaced could have adequately simplified the replacement operations, then allowing to operate in a simple and effective way with a gripping device and avoiding that one or more operators need to intervene directly on the component to be replaced.

The applicant has therefore found that to prepare the automatic machine for replacement operations by means of a control unit, which starts a procedure of configuration change in the automatic machine, and then pick up, move, release one or more components of the automatic machine by means of a gripping device controlled by an electronic processor, allows a single operator to manage the replacement remotely, advantageously at a considerable safety distance from the machine. In this way, the manual intervention of one or more specialized operators, which requires time and physical fatigue and subjects the outcome of the procedure to their ability and attention, is superfluous and can be substantially avoided for the entire duration of the replacement operations, in particular for format change.

Therefore, the present invention in a first aspect concerns a method for replacing a working component with a replacement working component in an automatic machine.

In particular, said method is suitable for a format change operation for the conversion of the automatic machine from manufacturing products of a first type to manufacturing products of a second type, different from the first type.

Preferably said method comprises a mapping phase.

Preferably, said mapping phase includes the step of defining a first fixed reference point relative to said automatic machine.

Preferably, said mapping phase includes the step of defining a position in machine of said working component relative to said first reference point by means of a machine coordinate system.

Preferably said method comprises a working phase.

Preferably said working phase includes the step of stopping said automatic machine.

Preferably, said working phase includes the step of starting a procedure of configuration change in said automatic machine by means of a control unit, which prepares said stopped automatic machine to pick up said working component from said position in machine.

Preferably, said working phase includes the step of detecting said first reference point by means of a detecting system.

Preferably, said working phase includes the step of determining by means of an electronic processor said position in machine as a function of said machine coordinate system.

Preferably, said working phase includes the step of positioning a gripping device at said position in machine.

Preferably, said working phase includes the step of picking up said working component by means of said gripping device.

Preferably, said working phase includes the step of releasing said working component into a storing position by means of said gripping device.

Preferably, said working phase includes the step of picking up the replacement working component from a stocking position by means of said gripping device.

Preferably, said working phase includes the step of positioning said gripping device at said position in machine, preferably while the automatic machine is still stopped.

Preferably said working phase includes the step of inserting said replacement working component in said position in machine.

Preferably said working phase includes the step of fixing said replacement working component in said position in machine.

Thanks to the implementation of the steps listed above, a control unit starts a procedure of configuration change in the automatic machine, which prepares for the replacement of the working component and a gripping device picks up, moves and releases the working component, thus avoiding that one or more operators intervene manually on the automatic machine and on the components. In this way, during replacement operations, the need for dedicated specialized personnel is reduced as well as the physical fatigue of the same, safety is improved, the probability of error is minimized and machine downtime is reduced.

It is also possible to provide for the step of picking up from the automatic machine and releasing in a storing position said working component by means of a first gripping device and the step of picking up from a stocking position and inserting said replacement working component into the automatic machine by means of a second gripping device, the two gripping devices being designed to operate simultaneously so that the time required for replacement is advantageously reduced. It is therefore clear that, for the purposes of the present invention, the two gripping devices are to be considered a technical equivalent of the single gripping device.

In a second aspect, the present invention concerns an apparatus comprising an automatic machine for manufacturing or packaging which includes a working component.

Preferably, said automatic machine comprises a control unit.

Preferably said apparatus comprises a working unit.

Preferably, said working unit includes a detecting system.

Preferably, said working unit includes a gripping device.

Preferably, said working unit includes an electronic processor, preferably associated with said detecting system and similarly preferably intended to control said gripping device.

Preferably, said control unit is suitable to carry out a method for replacing said working component according to the first aspect.

Preferably, said electronic processor is suitable to carry out a method for replacing said working component according to the first aspect.

Thanks to the characteristics of the apparatus of the invention, the manual intervention of one or more specialized operators is superfluous and can be substantially avoided for the entire duration of the replacement operations, in particular format change, consequently increasing the reliability of these operations and reducing machine downtimes, as well as reducing physical fatigue for the operator and improving safety.

In at least one of the aforementioned aspects, the present invention can also have at least one of the preferred characteristics disclosed in the following.

In some embodiments, said working component is an integral part of the automatic machine, preferably configured to carry out a first type of processing on consumable materials processed by the automatic machine.

In some embodiments, said replacement working component is designed to become an integral part of the automatic machine, preferably configured to carry out a second type of processing on consumable materials processed by the automatic machine.

Preferably, said second type of processing is different from said first type of processing.

Preferably said working phase includes the step of restarting the automatic machine only after the completion of insertion and fixing of the replacement working component.

In one or more embodiments, the replacement of said first working component with said second working component is part of a format change operation for the conversion of the automatic machine from manufacturing products of a first type to manufacturing products of a second type, different from the first type.

Preferably a gripping device is a hook or a gripper or a suction cup or a magnet or a vacuum pump, preferably of the mechanical or electromechanical or pneumatic or hydraulic type.

In some embodiments, said method comprises the step of starting, by means of said control unit, a second procedure of configuration change in said automatic machine, which prepares said automatic machine to operate with said replacement working component.

In this way, one or more specialized operators do not have to manually intervene at the end of the replacement operations to prepare the automatic machine to operate with the replacement working component, with the advantage that the operators are further relieved of physically stressful tasks, and with the additional advantage that the probability of errors and machine downtimes are further reduced.

In some embodiments, said mapping phase comprises the step of storing by means of said electronic processor at least said first reference point and said machine coordinate system.

The storage of the first reference point and of the machine coordinate system in the electronic processor has the advantage of relieving the operator from the task of registering the information acquired during the mapping phase, consequently eliminating any human errors linked to an incorrect or outdated registration.

Preferably said detection of said first reference point comprises the step of scanning at least a surface portion of said automatic machine.

Preferably said detection of said first reference point comprises the step of identifying a first marker in a point of said surface portion of the automatic machine.

Preferably, said detection of said first reference point comprises the step of associating said first reference point with said point of said surface portion of the automatic machine.

Preferably, at least one of said positionings is carried out by means of said electronic processor.

The positioning of the gripping device by means of the electronic processor has the clear advantage of relieving the operator from the task of directly or remotely handling this gripping device, preferably both for the handling of the working component and that of the replacement working component. In this way, the handling of the gripping device is independent from the experience or attention of the operator, in other words any human errors liked to incorrect or careless handling of the gripping device by the operator are avoided.

In one embodiment, at least one of said positionings comprises the step of calculating an optimal path.

In one embodiment, at least one of said positionings comprises the step of moving said gripping device along said optimal path.

Preferably, said calculating includes the step of minimizing at least one among length and movement time of said gripping device.

When the gripping device is moved along an optimal path, in particular a path with minimum length and/or movement time, the duration of the replacement procedure is optimized, since unnecessarily long and tortuous paths of the gripping device are avoided, and the machine downtime is advantageously reduced.

In a similarly preferred manner, said calculating includes the step of avoiding collisions of the gripping device and/or of the working component and/or of the replacement working component.

When the gripping device is moved along an optimal path, in particular by avoiding collisions of the gripping device and/or of the working component that the gripping device grips during movement, damage to the gripping device and/or the working component and/or the automatic machine is advantageously avoided with consequent cost and procedural savings.

In some embodiments, said storing position and said stocking position are located in a storage area.

In one embodiment, said mapping phase includes the step of defining a second fixed reference point relative to said storage area.

In some embodiments, said mapping phase comprises the step of storing said second reference point by means of said electronic processor.

In some embodiments, said mapping phase includes the step of defining at least said storing position relative to said second reference point by means of a storage coordinate system.

In some embodiments, said mapping phase comprises the step of storing said storage coordinate system by means of said electronic processor.

In some embodiments, said mapping phase includes the step of defining at least said stocking position relative to said second reference point by means of a stock coordinate system.

In some embodiments, said mapping phase comprises the step of storing said stock coordinate system by means of said electronic processor.

Storing the second reference point and/or the pick up coordinate system and/or the stock coordinate system in the electronic processor has the advantage of relieving the operator from the task of registering the information acquired during the mapping phase, consequently eliminating any human errors linked to an incorrect or outdated registration.

In one embodiment, said storing position and said stocking position are substantially coincident.

In this way the handling of the gripping device has the advantage of requiring a smaller number of control instructions. Furthermore, the area affected by the handling of the gripping device is relatively small, for the benefit of the safety procedures necessary to ensure the safety of the operators who pass through this area during the handling of the gripping device.

Preferably, said working phase includes the step of detecting said second reference point by means of said detecting system.

Preferably, said detection of said second reference point comprises the step of scanning at least a surface portion of said storage area.

Preferably, said detection of said second reference point comprises the step of identifying a second marker in a point of said surface portion of the storage area.

Preferably, said first marker and/or said second marker are one among a bar code, a QR code, a Charuco code, a graphic icon in particular chosen from a target, a cross, an asterisk, an arrow.

Preferably, said detection of said second reference point comprises the step of associating said second reference point with said point of said surface portion of the storage area.

In some embodiments, said fixing comprises the step of axially moving one or more mechanical fixing means by means of a fixing assembly of the electromechanical type.

Preferably, said fixing comprises the step of carrying out a control of the axial force exerted by said fixing assembly on said mechanical fixing means.

In some embodiments, said fixing comprises the step of rotating one or more mechanical fixing means by means of a fixing assembly of the electromechanical type.

Preferably, said fixing assembly comprises an electric or electro-pneumatic type screwdriver.

In a similarly preferred manner, said fixing comprises the step of carrying out a control with torque limiter of said fixing assembly.

Advantageously, a control of the axial force and/or a control with torque limiter of the fixing assembly prevent the latter from acting on the mechanical fixing means in an improper manner. In particular, these controls prevent the fixing assembly from exerting a force such as to damage the working component and/or the automatic machine, for example, by pushing an insert or a spacer or by screwing a screw into the working component or into the automatic machine with excessive force.

In one embodiment, at least one step of positioning comprises detecting a distance of said gripping device from said position in machine.

In one embodiment, at least one step of positioning comprises detecting a distance of said gripping device from said storing position.

In one embodiment, at least one step of positioning comprises detecting a distance of said gripping device from said stocking position.

Preferably, at least one step of detecting is carried out by one among an optical device, a photoelectric device and a radio frequency device.

Preferably, one of said optical device, photoelectric device and radio frequency device is fixed to said gripping device.

Preferably, one of said optical device, photoelectric device and radio frequency device is fixed to said working component.

Preferably, one of said optical device, photoelectric device and radio frequency device is fixed to said replacement working component.

Preferably, at least one of said positionings is also controlled as a function of said detected distance.

In some embodiments, said starting is carried out when said distance of the gripping device from said position in machine is less than a threshold value.

Preferably, said procedure of configuration change comprises the step of moving one or more further components of said automatic machine that prevent said gripping device from picking up said working component.

Preferably, said procedure of configuration change comprises the step of picking up one or more further components of said automatic machine by means of said gripping device.

In a preferred embodiment, said working phase comprises the step of sending to said electronic processor a replacement request, said replacement request being univocally associated with an information set comprising at least one among a machine code associated with the automatic machine involved in the replacement, a first reference code of said working component being replaced and a second reference code of said replacement working component.

Preferably, said information set comprises at least one among the mass of said working component, mass of said replacement working component, presence/absence of further components which prevent said gripping device from picking up said working component, presence/absence of fixing components suitable for fixing said working component to said automatic machine.

Preferably, said sending comprises the step of wirelessly transmitting said replacement request from a movable device to said electronic processor.

Preferably, said working phase comprises the step of acquiring a first identification code of said working component.

Preferably, said working phase comprises the step of acquiring a second identification code of said replacement working component.

In a preferred embodiment, said working phase comprises the step of carrying out a comparison of said first reference code and said first identification code.

In a preferred embodiment, said working phase comprises the step of carrying out a comparison of said second reference code and said second identification code.

Preferably, said acquiring comprises the steps of capturing a first set of one or more images of said working component and carrying out a processing of said first set of one or more images for acquiring said first identification code.

Preferably, said acquiring comprises the steps of capturing a second set of one or more images of said replacement working component, and carrying out a processing of said second set of one or more images for acquiring said second identification code.

Preferably, said acquiring comprises the steps of receiving a first radio signal emitted by said working component and carrying out a processing of said first radio signal for acquiring said first identification code.

Preferably, said acquiring comprises the steps of receiving a second radio signal emitted by said replacement working component and carrying out a processing of said second radio signal for acquiring said second identification code.

In some embodiments, said method comprises the step of controlling by means of said electronic processor a movable support to which said gripping device is fixed.

Preferably, said method comprises the step of driving by means of said electronic processor an Automated Guided Vehicle (AGV) to which said gripping device is connected, in particular, in a reversible manner.

Preferably said Automated Guided Vehicle (AGV) uses a guide technology chosen from wire guide, magnetic guide, guide with coloured band, odometric guide, mixed odometric and optical guide, triangulation with laser and GPS.

In one embodiment, said method comprises the step of transmitting a driving signal to said Automated Guided Vehicle (AGV) by means of the electronic processor.

Preferably, said method comprises the step in which said Automated Guided Vehicle (AGV) connects to said working unit.

Preferably, said method comprises the step in which said Automated Guided Vehicle (AGV) moves, together with the working unit connected thereto, into the proximity of the automatic machine.

In one embodiment, the method comprises repeating said working phase for replacing a further working component in said automatic machine.

Preferably, the method includes the step of using a conveyor belt on which said working component is released to be moved away from said gripping device and on which said replacement working component is arranged for approaching said gripping device.

Preferably, the method provides that said working component is released to be received by one or more operators and one or more operators arrange said replacement working component to be picked up by a gripping device.

In one embodiment, said working unit comprises a movable support to which said gripping device is fixed.

Preferably, said movable support is controlled by said electronic processor.

In a similarly preferred manner, said movable support is connected to an Automated Guided Vehicle driven by said electronic processor.

BRIEF DESCRIPTION OF THE DRAWINGS

The characteristics and advantages of the invention will become clear from the detailed description of a preferred embodiment, illustrated for descriptive and non-limiting purposes with reference to the attached drawings, wherein.

PREFERRED EMBODIMENTS OF THE INVENTION

The attached figures illustrate an apparatus 100 according to the present invention.

In the embodiment described, the apparatus 100 comprises a working unit 1 and an automatic machine 2, in particular for manufacturing cigarettes.

Figure 1:
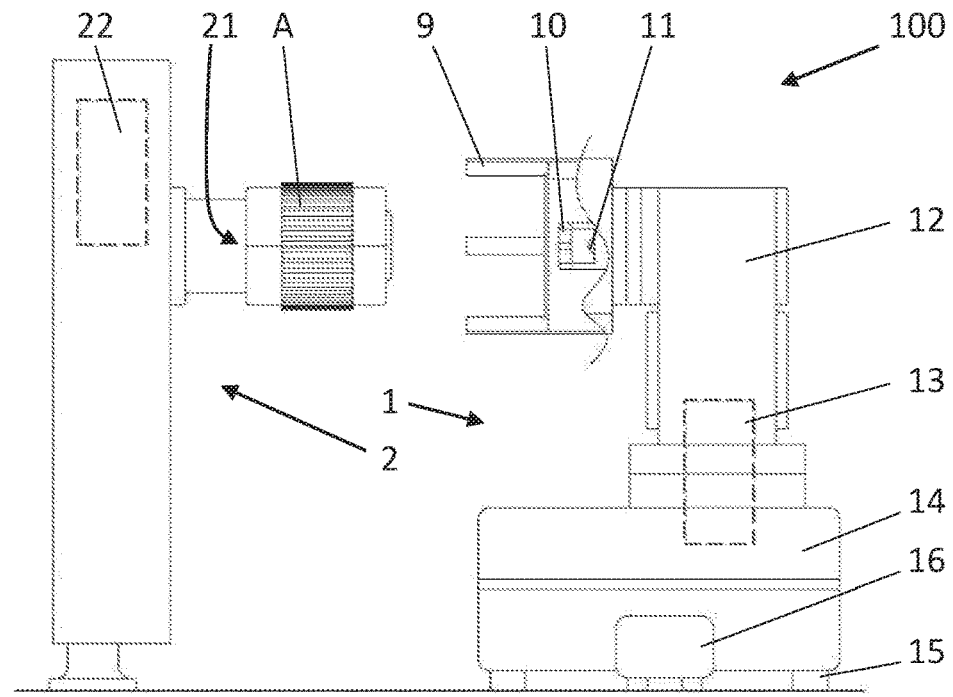
FIG. 1 is a schematic side view of an apparatus made to operate in accordance with a method according to the present invention in a given phase, with some parts sectioned for clarity.
Figure 2:
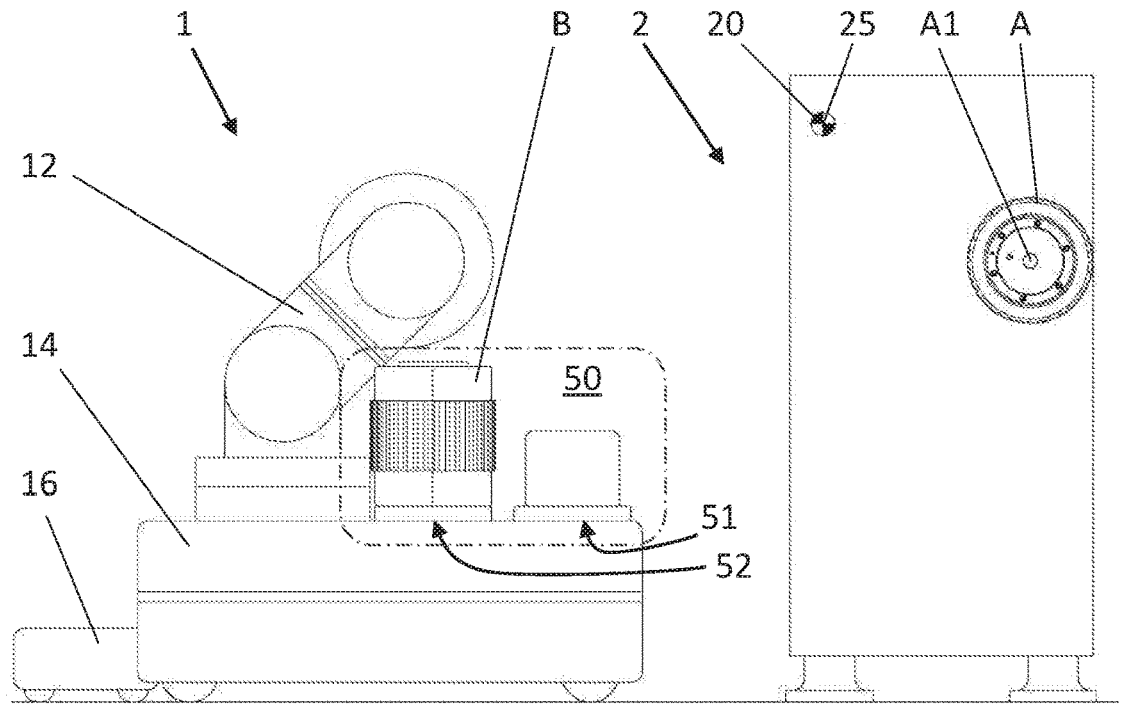
FIG. 2 is a schematic front view of the apparatus of FIG. 1.
Figure 3:
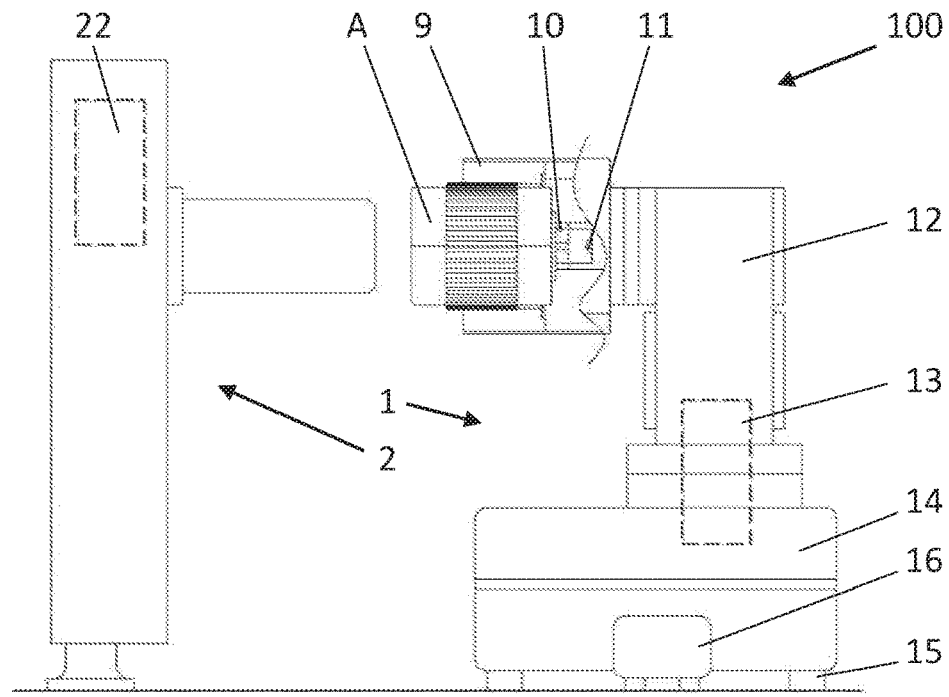
FIG. 3 is a schematic side view of the apparatus of FIG. 1 in another phase, different from the given previous phase, with some parts sectioned for clarity.
Figure 4:
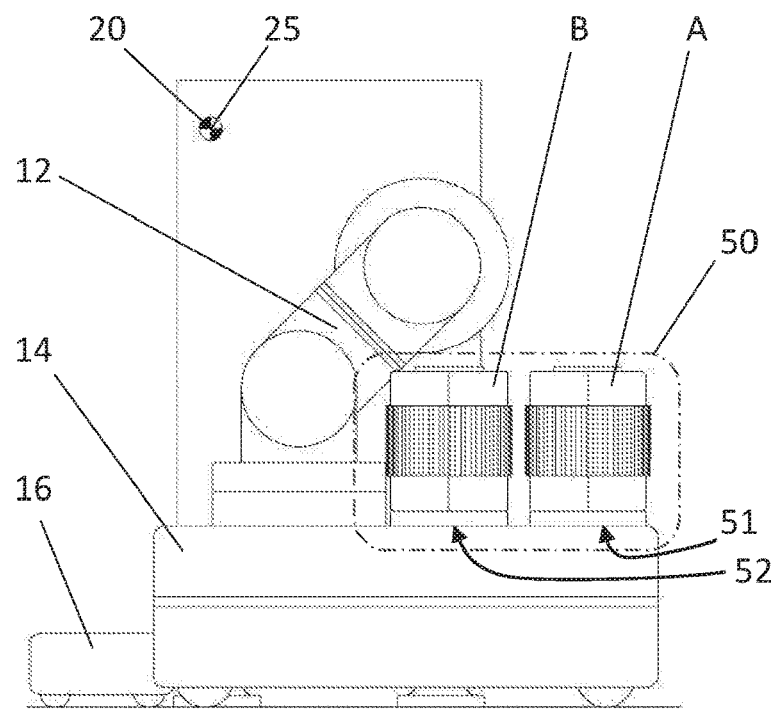
FIG. 4 is a schematic front view of the apparatus of FIG. 1 in a further phase, different from the previous phases.
Figure 5:
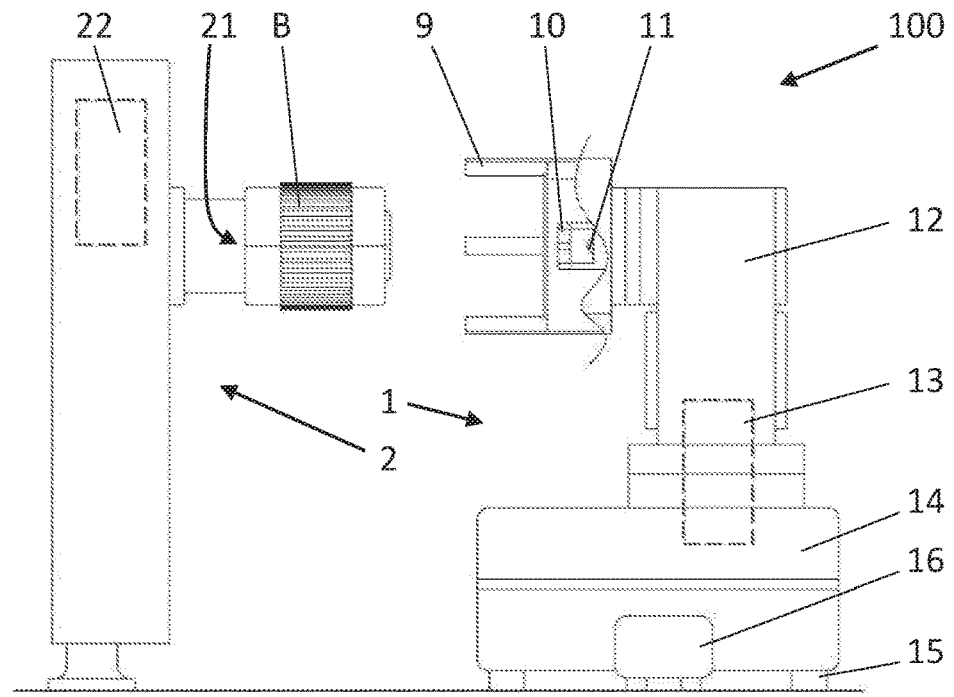
FIG. 5 is a schematic side view of the apparatus of FIG. 1 in another further phase, different from the previous ones, with some parts sectioned for clarity.
Figure 6:
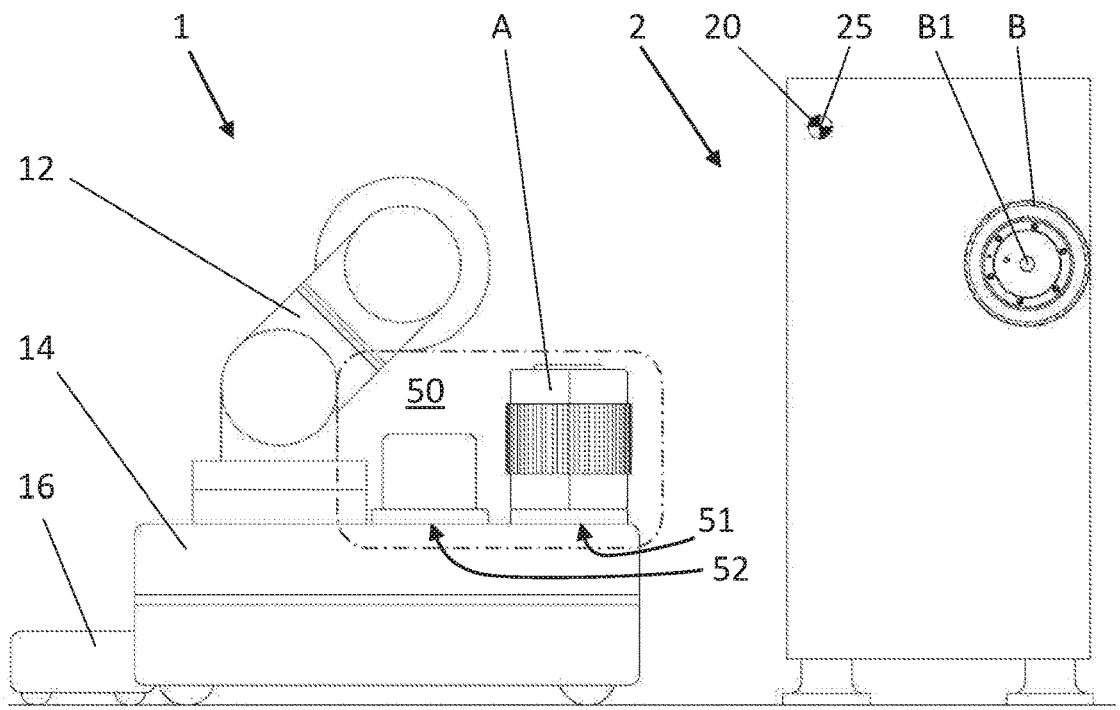
FIG. 6 is a schematic front view of the apparatus of FIG. 1 in the other further phase of FIG. 5.

The automatic machine 2 includes a working component A which is an integral part of the automatic machine 2 and is configured to carry out a given type of processing on consumable materials processed by the automatic machine 2. In particular, the working component A is a drum suitable for manufacturing a given cigarette format, and a control unit 22. In the configuration shown in FIG. 1, the drum A is fixed to the automatic machine 2 by mechanical fixing means, a fixing comb inserted in suitable cavities of the drum A and designed to rotate on a slide to disengage these cavities and pneumatic grippers designed to tighten a shaft A1 of the drum A. The fixing comb, the cavities and the pneumatic grippers are not shown in the figures.

The drum A is also provided with a first identification code.

The automatic machine 2 is provided with a first fixed reference point 25, identifiable by means of a marker 20, in particular a target, placed in a point of a surface portion of the automatic machine 2. In particular, the drum A is positioned in a respective position in machine 21 relative to the aforementioned reference point, defined by means of two, for example Cartesian, machine coordinates.

The working unit 1 includes a movable support 14, a robotic arm 12, a detecting system 11, a gripping device 9, a fixing assembly 10 and an electronic processor 13. The detecting system 11, the gripping device 9 and the fixing assembly 10 are assembled on a free end of the robotic arm 12. The electronic processor 13 is associated with the robotic arm 12, with the fixing assembly 10 and with the detecting system 11 and is designed to control them.

The detecting system 11 comprises for example an optical vision device, in particular a camera, and a laser distance measurement sensor.

The end of the robotic arm 12 opposite to the free one is fixed to the movable support 14. The movable support 14 is suitably provided with movement means 15, for example wheels, and advantageously connected to an Automated Guided Vehicle or AGV 16, driven for example by the electronic processor 13, in particular wirelessly.

The working unit 1 comprises, furthermore, a storage area 50, schematically shown in the figures with a rounded rectangle with a dash-dotted line, which includes a storing position 51 and a stocking position 52.

The storage area 50 comprises a second fixed reference point, identifiable by a second marker, not shown in the figure, placed in a point of the storage area 50. The storing position 51 is defined relative to said second reference point by means of two, for example Cartesian, storage coordinates while the stocking position 52 is defined relative to said second reference point by means of two, also for example Cartesian, stock coordinates. A replacement working component B is designed to become an integral part of the automatic machine 2 (when it is installed in place of the working component A) and is configured to carry out on the consumable materials processed by the automatic machine 2 a type of processing different from the type of processing carried out by the working component A. In particular, the replacement working component B is a replacement drum, arranged at the stocking position 52 within the storage area 50. The replacement drum B is provided with a second identification code.

The first reference point 25, the second reference point, the machine coordinates that define the position in machine 21 of the drum A, the storage coordinates that define the storing position 51 of the drum A and the stock coordinates that define the stocking position 52 of the replacement drum B are defined and stored by the electronic processor 13 in a mapping phase, for example, based on data transmitted or loaded into the electronic processor 13 by an operator.

When the drum A needs to be replaced with the replacement drum B, for example because the production of a cigarette format different from the one given is required and for which the replacement drum B must be used, a working phase is started.

In the working phase an operator sends, for example from a mobile device, a replacement request, univocally associated with an information set to the processor 13. This information includes a machine code associated with the automatic machine 2 involved in the replacement, a first reference code of the drum A and the mass of the drum A, and a second reference code of the replacement drum B and the mass of the replacement drum B, the presence of the fixing comb and the presence of the pneumatic grippers.

The electronic processor 13, provided that the working unit 1 is distant from an automatic machine 2, transmits an actuation signal to the AGV 16. The AGV 16 is then actuated by the electronic processor and moves, together with the working unit 1 connected thereto, into the proximity of the automatic machine 2.

To replace the drum A with the replacement drum B, the control unit 22 stops the automatic machine 2 in order to disassemble the drum A which is an integral part of the automatic machine 2 when the automatic machine 2 is stopped.

The electronic processor 13 controls the robotic arm 12 in order to move the end on which the detecting system 11 is assembled.

The latter scans a surface portion of the storage area 50 and identifies the second marker in a point of this surface portion of the storage area 50. The electronic processor 13 then detects the second reference point by associating it with the point of the surface portion of the storage area 50 where the second marker has been identified, and determines the storing position 51 of the drum A and the stocking position 52 of the replacement drum B.

The detecting system 11 also scans the surface portion of the automatic machine 2 and identifies the first marker in a point of this surface portion of the automatic machine 2. The electronic processor 13 then detects the first reference point associating it with the point of the surface portion of the automatic machine 2 where the first marker has been identified, and determines the position in machine 21 of the drum A.

The robotic arm 12 is controlled by the electronic processor 13 to position the gripping device 9 at the position in machine 21. More in detail, during the movement of the gripping device 9 the detecting system 11 by means of the laser sensor detects with a certain frequency a distance of the gripping device 9 from the position in machine 21 and controls the robotic arm 12 so that the gripping device 9 is finally positioned at a distance from the position in machine 21 such as to allow the same to correctly pick up the drum A (when the automatic machine 2 is stopped).

During the positioning of the gripping device 9, when the detected distance of the gripping device 9 from the position in machine 21 is less than a given threshold value, the electronic processor 13 sends an alert signal to the control unit 22, which starts a procedure of configuration change in the automatic machine 2. By way of the procedure of configuration change, the automatic machine 2 prepares itself to allow the picking up of the drum A from the position in machine 21, in particular the fixing comb rotates on a slide so as to disengage the cavities of drum A in which it was inserted and the pneumatic grippers release the shaft A1 of the drum A.

When the gripping device 9 is positioned at the position in machine 21, the camera of the detecting system 11 captures a first set of images of the drum A, which is transmitted to the electronic processor 13 to be processed and acquire the first identification code. The first identification code is then compared with the first reference code, for example, to verify that the gripping device 9 is correctly positioned at the position in machine 21.

At this point, the fixing assembly 10 acts on the mechanical fixing means, in particular it rotates said mechanical fixing means while the electronic processor 13 carries out a control with torque limiter of said fixing assembly 10, to release the drum A from the automatic machine 2 and the gripping device 9 picks up the drum A from the position in machine 21.

The robotic arm 12 is controlled by the electronic processor 13 to position the gripping device 9 which grips the drum A at the storing position 51. Also in this case, the positioning of the gripping device 9 is controlled by the detecting system 11 by means of the laser sensor which detects with a certain frequency a distance of the gripping device 9 from the storing position 51 and controls the robotic arm 12 so that the gripping device 9 is finally positioned at a distance from the storing position 51 such as to allow to release the drum A in an adequate and safe manner, that is, without causing damage to the drum A.

The robotic arm 12 is then controlled by the electronic processor 13 to position the gripping device 9 at the stocking position 52. Again, during the movement of the gripping device 9 the detecting system 11 detects with a certain frequency a distance of the gripping device 9 from the stocking position 52 and controls the robotic arm 12 so that the gripping device 9 is finally positioned at a distance from the stocking position 52 such as to allow the same to correctly pick up the replacement drum B.

When the gripping device 9 is positioned at the stocking position 52, the camera of the detecting system 11 captures a first set of images of the replacement drum B, which is transmitted to the electronic processor 13 to be processed and to acquire the second identification code. The second identification code is then compared with the second reference code, for example, to verify that the gripping device 9 is correctly positioned at the stocking position 52.

At this point, the gripping device 9 picks up the replacement drum B from the stocking position 52 and the robotic arm 12 is controlled by the electronic processor 13 to position the gripping device 9 at the position in machine 21. More in detail, during the movement of the gripping device 9 the detecting system 11, by means of the laser sensor, detects with a certain frequency a distance of the gripping device 9 from the position in machine 21 and controls the robotic arm 12 so that the gripping device 9 is finally positioned at a distance from the position in machine 21 such as to allow the same to correctly insert the replacement drum B (when the automatic machine 2 is stopped).

When positioned at the position in machine 21, the gripping device 9 inserts the replacement drum B into the position in machine 21 and the fixing assembly 10 acts on the mechanical fixing means, in particular rotates said mechanical fixing means while the electronic processor 13 carries out a control with torque limiter of said fixing assembly 10, so as to fix the replacement drum B in the automatic machine 2 (when the automatic machine 2 is stopped).

After positioning the replacement drum B, the robotic arm 12 is finally controlled by the electronic processor 13 to move the gripping device 9 away from the position in machine 21. Also, during this movement of the gripping device 9 the detecting system 11, by means of the laser sensor, detects with a certain frequency a distance of the gripping device 9 from the position in machine 21. When the detected distance of the gripping device 9 from the position in machine 21 is greater than a given threshold value, the electronic processor 13 sends a new alert signal to the control unit 22, which starts a second procedure of configuration change in the automatic machine 2. By means of the second procedure of configuration change, the automatic machine 2 prepares itself to operate with the replacement drum B, in particular the fixing comb rotates on the slide so as to appropriately engage the cavities of the replacement drum B and the pneumatic grippers grip a shaft B1 of the replacement drum B.

The automatic machine 2 is restarted after the completion of insertion and fixing of the replacement drum B, namely, after having restored the integrity of the automatic machine 2.

The invention claimed is:

1. A method for replacing a working component (A) with a replacement working component (B) in an automatic machine (2); the method comprising a mapping phase and a working phase, said mapping phase including: defining a first reference point (25) fixed relative to said automatic machine (2); defining a position in machine (21) of said working component (A) relative to said first reference point (25) by means of a machine coordinate system; and said working phase including: stopping the automatic machine (2); starting, by means of a control unit (22), a procedure of configuration change in said automatic machine (2) which procedure prepares said stopped automatic machine (2) for a withdrawal of said working component (A) from said position in machine (21); detecting said first reference point (25) by means of a detecting system (11); determining said position in machine (21) as a function of said machine coordinate system by means of an electronic processor (13); positioning a gripping device (9) at said position in machine (21); picking up said working component (A) by means of said gripping device (9); releasing said working component (A) in a storing position (51) by means of said gripping device (9); picking up the replacement working component (B) from a stocking position (52) by means of said gripping device (9); positioning said gripping device (9) at said position in machine (21); and inserting and fixing said replacement working component (B) in said position in machine (21) while the automatic machine (2) is still stopped.

2. The method according to claim 1, further comprising starting a second procedure of configuration change in said automatic machine (2) by means of said control unit (22), which procedure prepares said automatic machine (2) for working with said replacement working component (B).

3. The method according to claim 1, wherein said mapping phase comprises storing at least said first reference point (25) and said machine coordinate system by means of said electronic processor (13).

4. The method according to claim 1, wherein said detection of said first reference point (25) comprises the steps of scanning at least a surface portion of said automatic machine (2), identifying a first marker in a point of said surface portion of the automatic machine (2), associating said first reference point (25) with said point of said surface portion of the automatic machine (2).

5. The method according to claim 1, wherein at least one of said positionings is carried out by means of said electronic processor (13) and comprises the steps of calculating an optimal path and moving said gripping device (9) along said optimal path.

6. The method according to claim 1, wherein said storing position (51) and said stocking position (52) are located in a storage area (50), and said mapping phase includes defining a second reference point fixed relative to said storage area (50), at least said storing position (51) relative to said second reference point by means of a storage coordinate system and at least said stocking position (52) relative to said second reference point by means of a stock coordinate system.

7. The method according to claim 6, wherein said working phase includes detecting by means of said detecting system (11) said second reference point.

8. The method according to claim 7, wherein said detection of said second reference point comprises the steps of scanning at least a surface portion of said storage area (50), identifying a second marker in a point of said surface portion of the storage area (50), associating said second reference point with said point of said surface portion of the storage area (50).

9. The method according to claim 1, wherein at least one step of positioning comprises detecting a distance of said gripping device (9) from at least one of said positions in machine (21), storing position (51) and stocking position (52), said at least one step of positioning being also controlled as a function of said detected distance.

10. The method according to claim 9, wherein said starting is carried out when said distance of the gripping device (9) from said position in machine (21) is less than a threshold value.

11. The method according to claim 1, wherein said procedure of configuration change comprises moving one or more further components of said automatic machine (2) that prevent said gripping device (9) from picking up said working component (A).

12. The method according to claim 1, wherein said working phase comprises the step of transmitting a replacement request to said electronic processor (13), said replacement request being univocally associated with an information set comprising at least one of a first reference code of said working component (A) being replaced and a second reference code of said replacement working component (B).

13. The method according to claim 12, wherein said working phase comprises the steps of acquiring at least one of a first identification code of said working component (A) and a second identification code of said replacement working component (B) and carrying out at least one of a comparison of said first reference code and said first identification code and a comparison of said second reference code and said second identification code.

14. The method according to claim 1, wherein the replacement of said working component (A) with said replacement working component (B) is part of a format change operation for the conversion of the automatic machine (2) from manufacturing products of a first type to manufacturing products of a second type other than the first type.

* * * * *